United States Patent
Kwan (10) Patent No.: US 10,529,079 B2
(45) Date of Patent: Jan. 7, 2020

(54) TARGET DETECTION, TRACKING, AND CLASSIFICATION IN COMPRESSIVE MEASUREMENT DOMAIN

(71) Applicant: Applied Research, LLC, Rockville, MD (US)

(72) Inventor: Chiman Kwan, Rockville, MD (US)

(*) Notice: Subject to any disclaimer, the term of this patent is extended or adjusted under 35 U.S.C. 154(b) by 82 days.

(21) Appl. No.: 15/888,044

(22) Filed: Feb. 4, 2018

(65) Prior Publication Data
US 2019/0244371 A1     Aug. 8, 2019

(51) Int. Cl.
| | |
|---|---|
| G06T 7/262 | (2017.01) |
| G06K 9/62 | (2006.01) |
| H04N 5/14 | (2006.01) |
| G06K 9/42 | (2006.01) |
| G06T 7/246 | (2017.01) |
| H04N 19/132 | (2014.01) |
| G06K 9/32 | (2006.01) |

(52) U.S. Cl.
CPC .............. *G06T 7/262* (2017.01); *G06K 9/32* (2013.01); *G06K 9/42* (2013.01); *G06K 9/6277* (2013.01); *G06T 7/251* (2017.01); *H04N 5/144* (2013.01); *H04N 19/132* (2014.11); *G06T 2207/10016* (2013.01); *G06T 2207/20056* (2013.01); *G06T 2207/20076* (2013.01)

(58) Field of Classification Search
CPC ..................... G06T 7/262; G06T 7/251; G06T 2207/10016; G06T 2207/20056; G06T 2207/20076; G06K 9/32; G06K 9/42; G06K 9/6277; H04N 19/132; H04N 5/144

See application file for complete search history.

(56) References Cited

U.S. PATENT DOCUMENTS

| | | | | |
|---|---|---|---|---|
| 6,028,971 | A * | 2/2000 | Inuiya | G06T 5/20 382/162 |
| 9,342,759 | B1 * | 5/2016 | Chen | G06K 9/6262 |
| 9,581,431 | B1 * | 2/2017 | Sieracki | G01B 11/005 |
| 2003/0081836 | A1 * | 5/2003 | Averbuch | G06K 9/38 382/199 |
| 2004/0126013 | A1 * | 7/2004 | Olson | G06T 7/12 382/173 |

(Continued)

*Primary Examiner* — James M Pontius
(74) *Attorney, Agent, or Firm* — IP-R-US, LLC; Peter S. Wong

(57) ABSTRACT

The present invention is to provide a method and system using compressed data directly for target tracking and target classification in videos. The present invention uses a video imager to generate compressive measurements, and a random subsampling operator to compress the video data. It uses a Gaussian Mixture Model (GMM) for target detection and manual location of the target and putting a bounding box around the targets in the first frame is not required. It further applies a saliency-based algorithm to re-center the captured target. This re-centering process can be repeated multiple times and each application of re-centering will improve over the previous one. A pixel completion algorithm is used to fill in the missing pixels for the captured target area. A Sparse Representation Classification (SRC) for target classification. Both the target templates in a dictionary and captured targets are transformed to the frequency domain using Fast Fourier Transform (FFT).

11 Claims, 6 Drawing Sheets

(a)

(b)

(a) Visualization of the sensing matrix for a random subsampling operator with a compression factor of 2. The subsampling operator is applied to a vectorized image; (b) a random mask is applied to an image (56) References Cited

U.S. PATENT DOCUMENTS

| | | | |
|---|---|---|---|
| 2007/0133840 A1* | 6/2007 | Cilia | G06K 9/00369 |
| | | | 382/103 |
| 2008/0291285 A1* | 11/2008 | Shimizu | H04N 5/144 |
| | | | 348/208.6 |
| 2009/0324016 A1* | 12/2009 | Ikeda | G01S 3/7864 |
| | | | 382/103 |
| 2010/0134632 A1* | 6/2010 | Won | G06K 9/32 |
| | | | 348/169 |
| 2011/0026808 A1* | 2/2011 | Kim | G06T 7/50 |
| | | | 382/154 |
| 2012/0207396 A1* | 8/2012 | Dong | G06T 5/002 |
| | | | 382/218 |
| 2015/0117784 A1* | 4/2015 | Lin | G06K 9/4671 |
| | | | 382/195 |
| 2017/0083764 A1* | 3/2017 | Risinger | G06T 7/11 |
| 2017/0083765 A1* | 3/2017 | Risinger | G06K 9/00624 |
| 2017/0083790 A1* | 3/2017 | Risinger | G06T 1/20 |
| 2017/0091943 A1* | 3/2017 | Pan | G06K 9/34 |
| 2018/0115745 A1* | 4/2018 | Kimura | G09G 5/00 |
| 2019/0130586 A1* | 5/2019 | Zhou | G06T 7/254 |

* cited by examiner

Fig. 1: (a) Visualization of the sensing matrix for a random subsampling operator with a compression factor of 2. The subsampling operator is applied to a vectorized image; (b) a random mask is applied to an image Fig. 2: A conventional tracker fails to track a target. The bounding box is far away from the target on the right Fig. 3: New approach to object detection, tracking, and classification based on randomly subsampled video frames Fig. 4: A GMM based detection can still track a target with 50% missing data Fig. 5: Motion detection results using GMM on random subsampling operators at different compression rates of (a) 2 times, (b) 4 times, (c) 8 times, and (d) 16 times Fig. 6: Effects of re-centering on a frame when the tracking result is not centered on the target: (a) tracking result on the frame; (b) cropped area from tracking; (c) saliency region and the calculated centroid; and (d) centering result when the centroid is moved to the center of cropped area Fig. 7: Left: OMP/ALM-II; right: GSR Fig. 8: Multi-frame Group Sparse Representation (MFGSR): enforce coefficient matrix to have non-zero elements within one active group across multiple consecutive frames Fig. 9: Comparison of classification performance versus dimensional reduction rate on the compressed measurement domain using random subsampling operator and motion detection for different structured sparsity-based representation models on SENSIAC dataset: (a) MWIR sensor, and (b) visible sensor

TARGET DETECTION, TRACKING, AND CLASSIFICATION IN COMPRESSIVE MEASUREMENT DOMAIN

BACKGROUND OF THE INVENTION

Target tracking using videos has wide range of applications (see cited references #1-#7), such as, traffic monitoring, video surveillance, security monitoring, etc. Conventional video imagers do not have missing data. In some bandwidth constrained applications, these video imagers may require large bandwidth for transmission, and huge disk space for storage.

A traditional compressive imager is an imager with much fewer pixels than a conventional imager where every pixel is captured. In the traditional compressive sensing approach, a Gaussian random matrix is applied to an image frame with N pixels to obtain one single measurement, and this process is repeated M times for an image. If M<<N, then data compression is achieved. It has been proven that under certain conditions, even if for the case of M<<N, one can still reconstruct the originally image with high fidelity.

Figure 1:
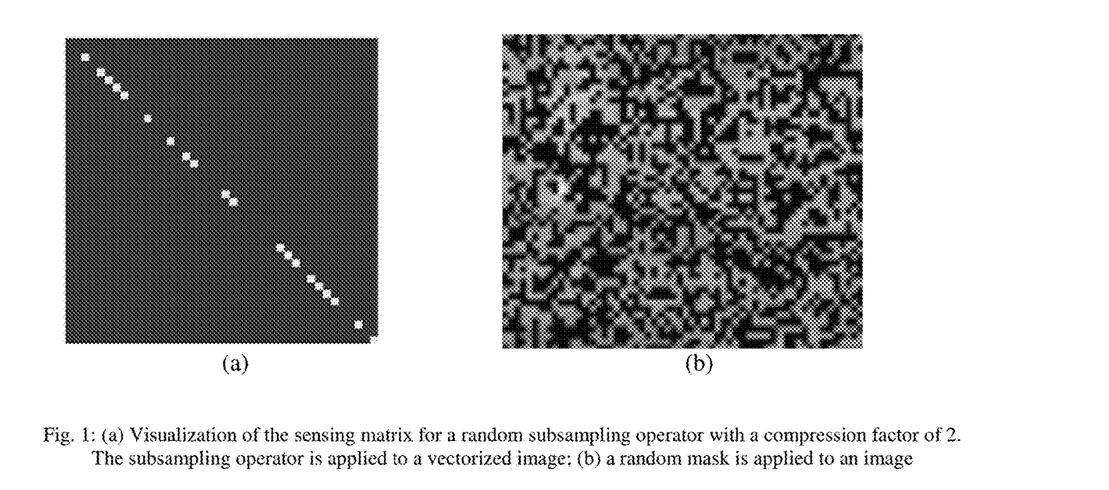

In order to accurately perform target classification in compressive measurement domain, it is necessary to know where the target is in an image. If a random Gaussian sensing matrix is applied to the whole raw image, then the spatial information in the raw image is lost, and it is not feasible to perform target tracking and target classification directly in the compressive measurement domain. There are no papers available at present that discuss the above direct tracking and classification problem using Gaussian sensing matrix. However, target tracking, detection, and classification are still hopeful if a random subsampling operator is used to compress the video images. The random subsampling operator is a special case of a random sensing matrix. This is similar to using a sensing matrix by randomly zeroing out certain elements from the diagonal of an identity matrix. FIG. 1 of the present application displays two examples of a random subsampling sensing matrices.

Figure 2:
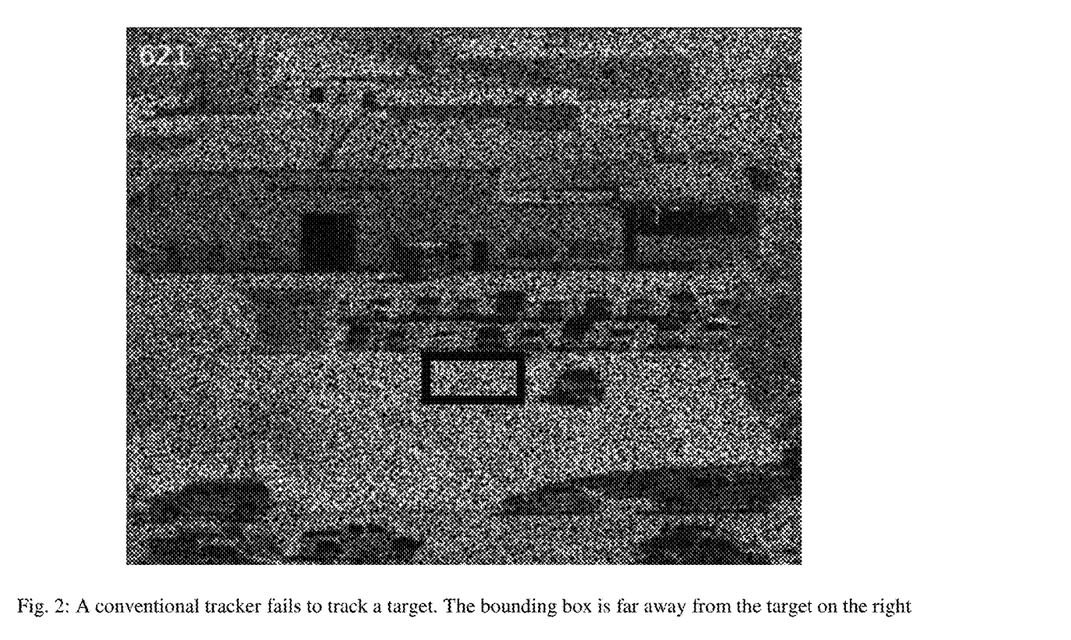
FIG. 2 illustrates one example of a well-known tracker called STAPLE (cited reference #5) which fails to track a target. The bounding box is far away from the target on the right.

For compressive measurement via a random subsampling operator, a conventional tracking algorithm cannot perform well directly in the compressive measurement domain, even when the compression rate is small (e.g., smaller than 2 or 4 times). FIG. 2 shows one example of a well-known tracker called STAPLE (cited reference #5), which cannot even track the target when the missing rate is at 50%.

BRIEF SUMMARY OF THE INVENTION

One objective of the present invention is to provide a method and system, which can use compressed data directly for target tracking and target classification in videos.

Another objective of the present invention is to provide a method and system that can save data storage space and transmission bandwidth of videos.

Another objective of the present invention is to use a video imager which can generate compressive measurements.

Another objective of the present invention is to apply a random subsampling operator to compress the video data. The random subsampling operator can be the same throughout all frames. The subsampling operator can also be different for different frames.

Another objective of the present invention is to use a Gaussian Mixture Model (GMM) for target detection and there is no need to manually locate the target in the first frame. In contrast, many tracking algorithms in the literature do require humans to put a bounding box around the targets in the first frame.

Another objective of the present invention is to apply a saliency-based algorithm to re-center the captured target. This re-centering process can be repeated multiple times and each application of re-centering will improve over the previous one.

Another objective of the present invention is that a pixel completion algorithm is used to fill in the missing pixels for the captured target area. Any matrix completion algorithms (cited references #8-#11) can be used.

Another objective of the present invention is that a Sparse Representation Classification (SRC) (cited references #12-#17) is used for target classification. Both the target templates in a dictionary and captured targets are transformed to the frequency domain using Fast Fourier Transform (FFT). The use of FFT further reduces the centering error and improves the overall classification performance.

Another objective of the present invention is that a decision level fusion based on voting is applied that can further improve the classification performance.

Another objective of the present invention is that the algorithm can be applied to stationary camera or moving camera. If camera moves a lot, the GMM model can be reset more frequently.

Yet another objective of the present invention is that the algorithms can be implemented in low cost Digital Signal Processor (DSP) and Field Programmable Gate Array (FPGA) for real-time processing.

BRIEF DESCRIPTION OF THE DRAWINGS

FIG. 1, (a) shows a visualization of the sensing matrix for a random subsampling operator with a compression factor of 2. The subsampling operator is applied to a vectorized image. This is equivalent to applying a random mask shown in FIG. 1, (b) to an image.

DETAILED DESCRIPTION OF THE INVENTION

Figure 3:
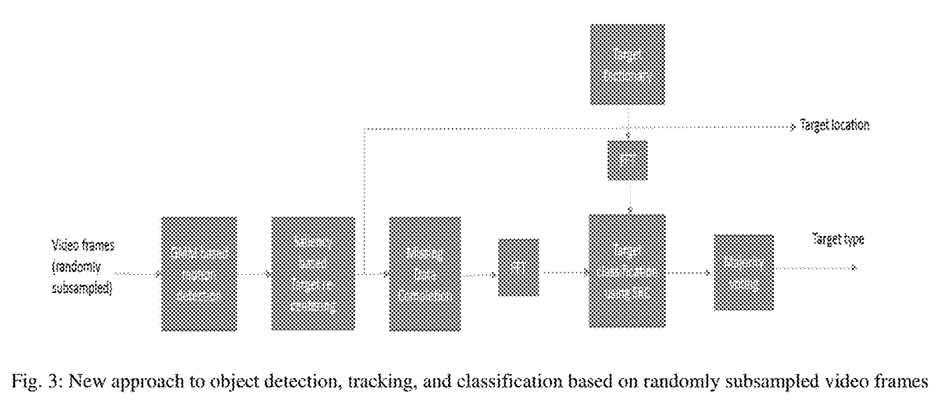
FIG. 3 illustrates a new approach to object detection, tracking, and classification based on randomly subsampled video frames.

Referring to FIG. 3 of the present invention, an integrated framework of target detection, tracking, and classification using the random subsampling operator, which can still be considered as the compressed measurement domain, is proposed. FIG. 3 summarizes the key steps in the new approach of the present invention. First, the present invention imposes a motion detection algorithm to determine the moving objects of interest and use those as inputs for the classification step. A motion detection algorithm is based on a background modeling of the whole frame. Hence, it is not affected by the mismatched non-zero locations and can result in reasonably good performance even the missing rate is high. In the present invention, a motion detection algorithm based on Gaussian Mixture Model (GMM) background subtraction (cited reference #6) is used. Second, the present invention proposes a saliency-based re-centering algorithm to locate the centroid of the target. This step can be repeated multiple times based on our experience. The output of the re-centering step is the target location information. Third, the missing pixels in the detected target area are filled in by some missing data completion algorithms. Fourth, the present invention proposes a target classification based on Sparse Representation Classification (SRC). In particular, a frequency domain approach which has better classification than a spatial domain approach is proposed. The target templates in the dictionary are also transformed to the frequency domain. The classification is done in the frequency domain. Finally, a voting-based scheme is proposed to further improve the overall classification performance.

Generally, a motion detection provides the target location with less accuracy than what a tracker can do when there is no missing data. However, when there are missing pixels, motion detection is more accurate and flexible because it can locate a region of interest directly in the compressed measurement via a random subsampling operator and requires no input of a target location during initialization. Furthermore, with the target re-centering idea based on saliency of the present invention, the negative effect of lower accuracy on target locations can be minimized. Hence, the advantage of classification on random subsampling operator and motion detection with re-centering refinement is four-fold:

Require no prior input of target location;
Perform motion detection in the compressed domain;
Perform target classification in the frequency domain;
The classification accuracy is better than spatial domain.

Target Detection Using GMM

A Gaussian Mixture Model (GMM) is a parametric probability density function represented as a weighted sum over all Gaussian component densities. In a motion detection model, the probability of observing a particular pixel over a sequence of time $\chi_t = \{x^{(1)}, x^{(2)}, \ldots, x^{(t)}\}$ is modeled by a mixture of M Gaussian distributions:

$$P(\chi_t) = \Sigma_{m=1}^{M} w_{m,t} \eta(\chi_t; \mu_{m,t}, \Sigma_{m,t}) \quad (1)$$

where $w_{m,t}$, $\mu_{m,t}$, and $\Sigma_{m,t}$ are the estimated weight, mean value and covariance matrix of the $m^{th}$ Gaussian in the mixture at time t, correspondingly, and $\eta$ is the Gaussian probability density function.

Figure 4:
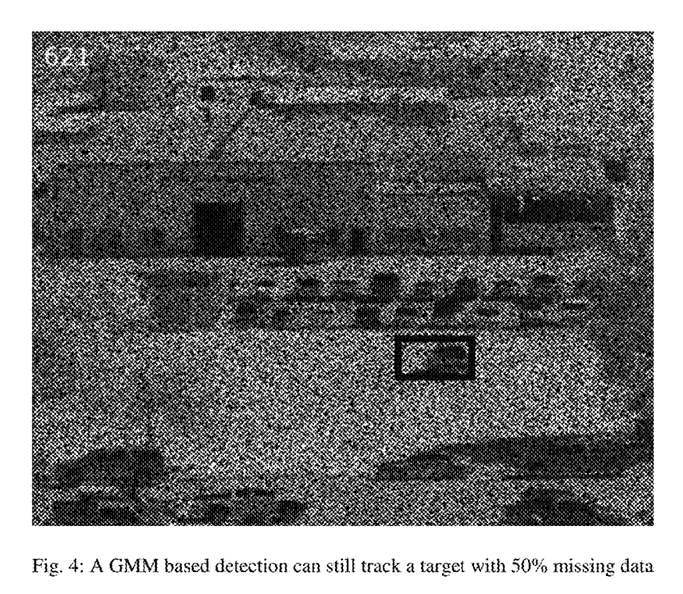
FIG. 4 illustrates a GMM based detection can still track a target with 50% missing data.

The number of GMM, M, is normally set to be between 3 and 5, depending on the available memory and computational power (M=3 in experiments in the present invention). A background model is then learned, and every pixel is classified as background or foreground. In our case, detected pixels around a moving object are scattered because we process the motion detection task directly on the missing-pixel sequence in the compressed measurement domain; hence simple morphological dilation and erosion steps are added to group nearby detected pixels before determining the whole moving objects in a sequence. FIG. 4 illustrates a GMM based detection can still track a target with 50% missing data.

Figure 5:
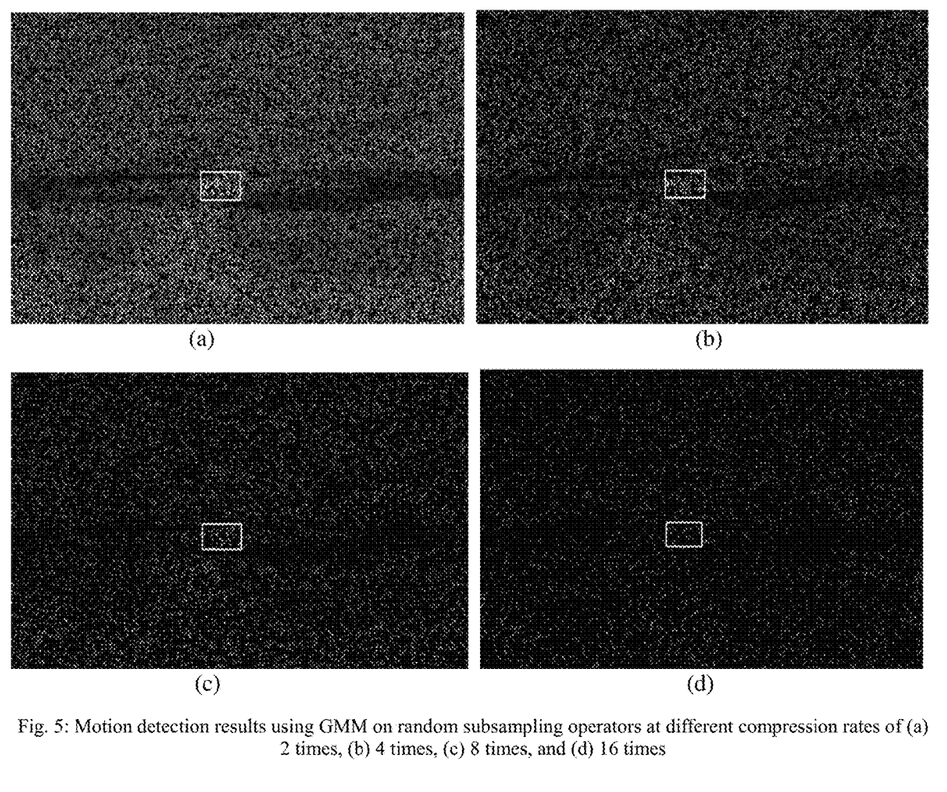
FIG. 5 illustrates a motion detection results using GMM on random subsampling operators at different compression rates; (a) shows a compression rate of 2 times; (b) shows a compression rate of 4 times; (c) shows a compression rate of 8 times; and (d) shows a compression rate of 16 times.

FIG. 5, (a)-(d) demonstrate the motion detection results on random subsampling operators at different compression rates of 2, 4, 8 and 16 times, respectively. It is quite noticeable that even at the missing rate of almost 93.75% (i.e., a compression rate of 16 times), the detected moving object is still aligned with those of lower missing rates. These motion detection outputs are then used as inputs of our proposed sparsity-based classification algorithms using compressed measurements.

Re-Centering Using Saliency Detection

Figure 6:
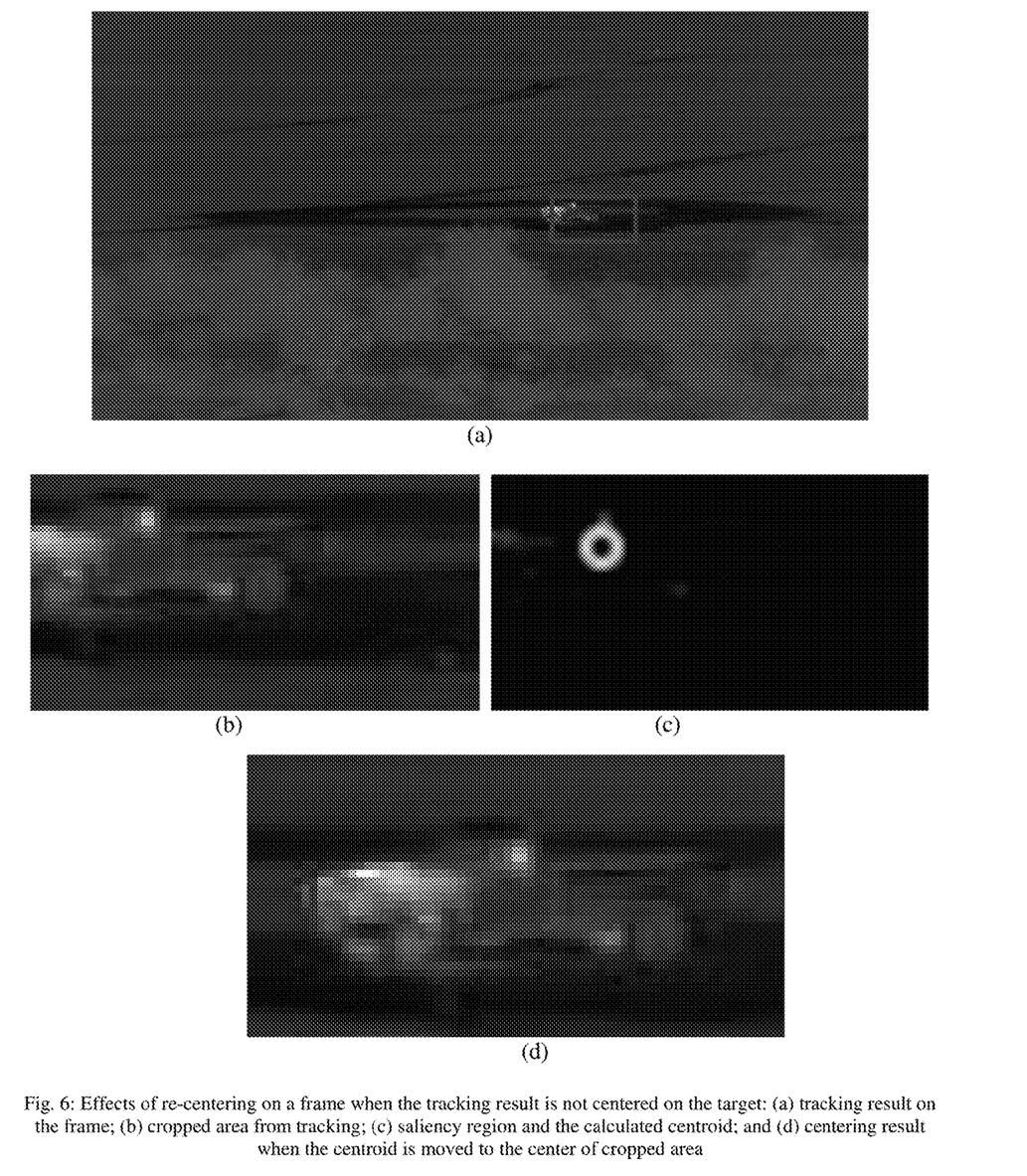
FIG. 6 illustrates the effects of re-centering on a frame when the tracking result is not centered on the target; (a) shows tracking result on the frame; (b) shows a cropped area from tracking; (c) shows a saliency region, and the calculated centroid; and (d) shows centering result when the centroid is moved to the center of cropped area.

One problem with GMM based detector is that the calculated tracking results are not always well-centered around the targets, especially when targets abruptly change their directions and viewing angles along their moving paths, which can largely degrade the classification accuracy. Therefore, we propose a target centering step that can automatically align each target to the center. To do this, we implement a region-based saliency detection algorithm (cited reference #7) that extract the saliency region via combining the mean subtraction filter at three different scales. The centroid of the saliency region is then computed, and the target is finally centered by moving to the centroid location. FIG. 6 show the effectiveness of re-centering a target on a frame when the tracking result is off from its center. It should be noted that this re-centering can be done multiple times and each re-centering step can be better than the previous results.

Table 1 compares the performance between classifying results that have been manually cropped with those from tracking with and without re-centering on the SENSIAC (cited reference #20) database collected by the U.S. Army Night Vision and Electronic Sensors Directorate (NVESD) to classify 7 civilian and military vehicles using MWIR data. Four sparsity-based methods are used in this experiment including Orthogonal Matching Pursuit (OMP) (cited reference #18), $l_1$-based Augmented Lagrangian Multiplier method (ALM-11) (cited reference #19), Group Sparse Representation (GSR), and Multi-Frame Group Sparse Representation (MFGSR). One can see that by re-centering the tracking results, the classification performance is significantly improved compared with directly taking tracking results without re-centering, and almost comparable with results employed on the manually pre-process inputs.

TABLE 1

Classification performance comparison on the original ATR data using tracking results with and without re-centering targets.

| Method | Manually cropped | Tracking without re-centering | Tracking with re-centering |
| --- | --- | --- | --- |
| OMP | 72.31 | 59.15 | 70.67 |
| ALM-11 | 74.00 | 60.17 | 71.25 |
| GSR | 76.03 | 63.73 | 72.69 |
| MFGSR | 80.94 | 70.31 | 77.26 |

Classification Using Frequency Domain SRC Approach
Direct SRC Approach in Spatial Domain The present invention applies Sparse Representation Classification (SRC) based approaches (cited references #12-#17) for target classification. After a moving object is determined, the cropped region around it is extracted and classified directly in the compressed domain. Generally, this cannot be done with a dense sensing matrix such as a Gaussian one because the information is spread out over the whole frame through a matrix multiplication. However, for a random subsampling operator, the local sensing patch $\Phi^i$ can be extracted from each cropped region as an identity matrix with zero elements in the diagonal corresponding to the locations of missing pixels (see FIG. 1). Hence the missing cropped region of a moving target $y^i$ can be represented as a sparse linear representation of training samples over a local sensing patch $\Phi^i$ as the following:

$$y^i = \Phi^i x^i = [\Phi^i D_1 \ \Phi^i D_2 \ \ldots \ \Phi^i D_C] \begin{bmatrix} a_1 \\ a_2 \\ \ldots \\ a_C \end{bmatrix} = D_{\Phi^i} a \quad (2)$$

where $D_1, D_2, \ldots, D_c$ are class sub-dictionaries of the C classes, $\Phi^i D_c$ (c=1, 2, ... C) is the feature representation of the class c over a local sensing patch $\Phi^i$, $D_{\Phi^i}$ is the training dictionary in compressed domain, a is the unknown coefficient vector, and $a_c$ is the corresponding sparse code of sub-dictionary $\Phi^i D_c$.

Equation (2) can be simplified by replacing the representation over a local sensing patch $\Phi^i$ by a dot product of a mask vector $m^i$ with values of zeroes at locations where missing pixels are located and ones otherwise:

$$y^i = \langle m^i, x^i \rangle = [\langle m^i, D_1 \rangle \ \langle m^i, D_2 \rangle \ \ldots \ \langle m^i, D_C \rangle] \begin{bmatrix} a_1 \\ a_2 \\ \ldots \\ a_C \end{bmatrix} = D_{\Phi^i} a \quad (3)$$

Orthogonal Matching Pursuit (OMP) is described as an $l_0$-based minimization problem (cited reference #18):

$$a^* = \underset{a}{\operatorname{argmin}} \|y^i - D_{\Phi^i} a\|_2 \quad (4)$$

s.t. $\|a\|_0 \leq K$ where K is the sparsity-level of a (K<<N), and ALM-11 solves for the $l_1$-minimization convex relaxation.

$$a^* = \underset{a}{\operatorname{argmin}} \|y^i - D_{\Phi^i} a\|_2 + \lambda \|a\|_1 \quad (5)$$

where the positive weighting parameter $\lambda$ provides the trade-off between the two terms.

A sparse representation or structured sparse representation model is then processed, and the class label is decided by the minimal residual rule.

Adding group or class information is a common way to promote structure within sparse supports. The idea of adding group structure has been intensively studied and empirically evaluated to better represent signals in several applications, such as, soil monitoring (cited reference #16) or fire damage assessment (cited reference #12). This concept is normally beneficial for classification tasks where the dictionary atoms are grouped, and the sparse coefficients are enforced to have only a few active groups (classes) at a time. The GSR model for target recognition for compressed measurements can be extended from the $l_1$-based minimization problem as $$\underset{a}{\min} \|a\|_1 + \lambda_G \sum_{c=1}^{C} \|a_c\|_2 \quad (6)$$

s.t. $y = D_\phi a$, where $a_c$ is the sub-matrix extracted from the coefficient vector a using the rows indexed by group c, and $\lambda_G$ is a positive weighting parameter balancing between the two regularizations.

Figure 7:
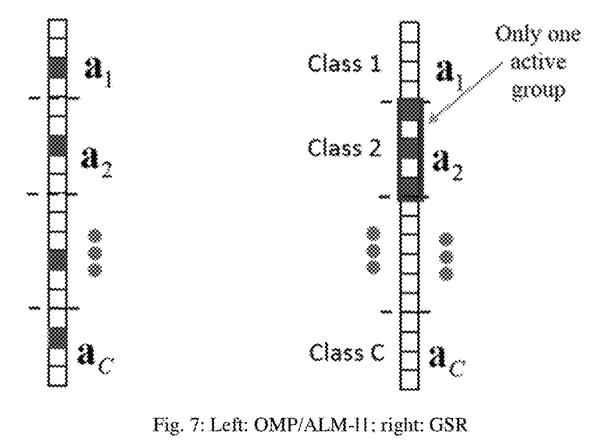
FIG. 7 illustrates on the Left: Orthogonal Matching Pursuit/Augmented Lagrangian Multiplier method (OMP/ALM-11); and on the Right: Group Sparse Representation (GSR).

While the first term $\|a\|_1$ encourages element-wise sparsity in general, the second term in (6) is a group regularizer that tends to minimize the number of active groups. This results in a two-level sparsity model in (6): group-sparse and sparse within group. FIG. 7 illustrates the comparison between GSR and non-GSR approaches.

Multi-measurement sparsity models which assume the fact that measurements belonging to the same class can be simultaneously represented by a few common training samples in the dictionaries have been successfully applied in many applications. For instance, a joint sparse representation-based method is proposed in one of our works in the cited reference #14, for target detection in hyperspectral imagery. The model exploits the fact that the sparse representations of hyperspectral pixels in a small neighborhood tend to share common sparsity patterns.

Figure 8:
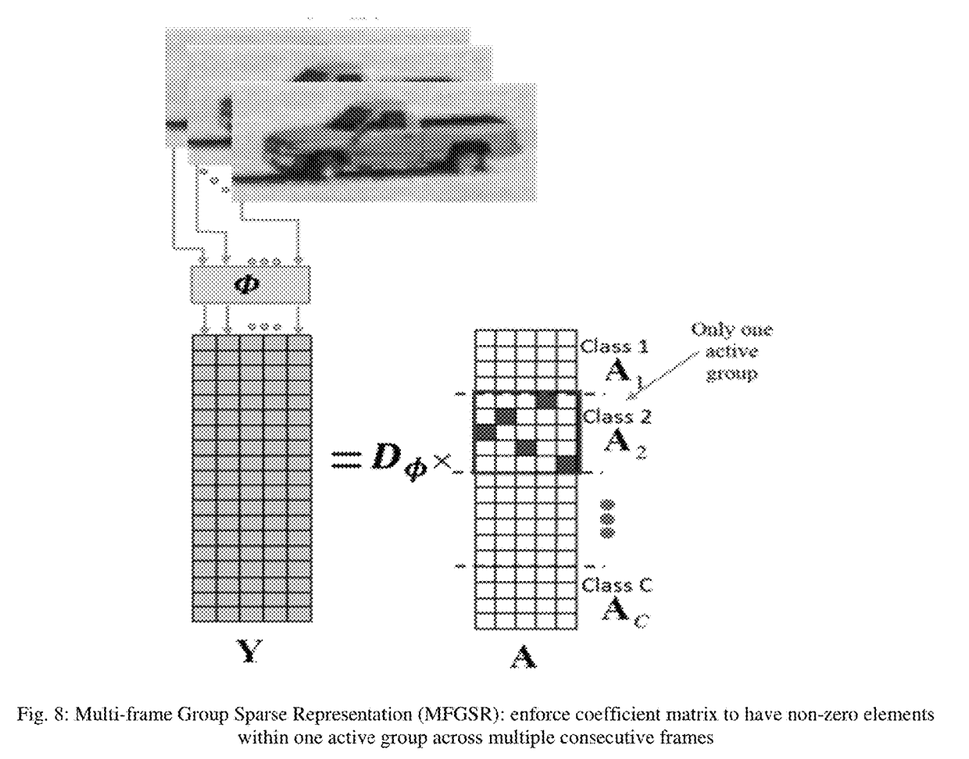
FIG. 8 illustrates a Multi-Frame Group Sparse Representation (MFGSR): enforce coefficient matrix to have non-zero elements within one active group across multiple consecutive frames.

In this approach, we further extend the GSR model (6) by exploiting correlation among data samples in the temporal domain to further improve classification results. FIG. 8 illustrates the Multi-Frame GSR (MFGSR) idea. This can be done by gathering multiple consecutive frames in a sequence and collaboratively classifying the targets from these frames together. Particularly, group-sparsity concept is critically beneficial for target recognition in video sequences since objects from neighborhood frames typically represent the same targets, hence rather come from the same classes. Therefore, the present invention proposes a MF-GSR model for target recognition as the following optimization:

$$\underset{A}{\min} \|A\|_1 + \lambda_G \sum_{c=1}^{C} \|A_c\|_F \quad (7)$$

s.t. $Y = D_\phi A$, where $Y=[y^1, y^2, \ldots, y^T]=[\Phi x^1, \Phi x^2, \ldots, \Phi x^T]$ is the column-wise concatenated measurement matrix of T consecutive frames, $A=[a^1, a^2, \ldots, a^T]$ is the concatenation of coefficients vectors of the corresponding T frames, and $\|.\|_F$ is the Frobenious norm of a matrix.

In the present invention, T=5 is specifically picked in all the experiments (i.e., each frame in a sequence is collaboratively classified with its two previous and two future frames).

The above four sparsity-based methods were used in this experiment including Orthogonal Matching Pursuit (OMP)

Figure 9:
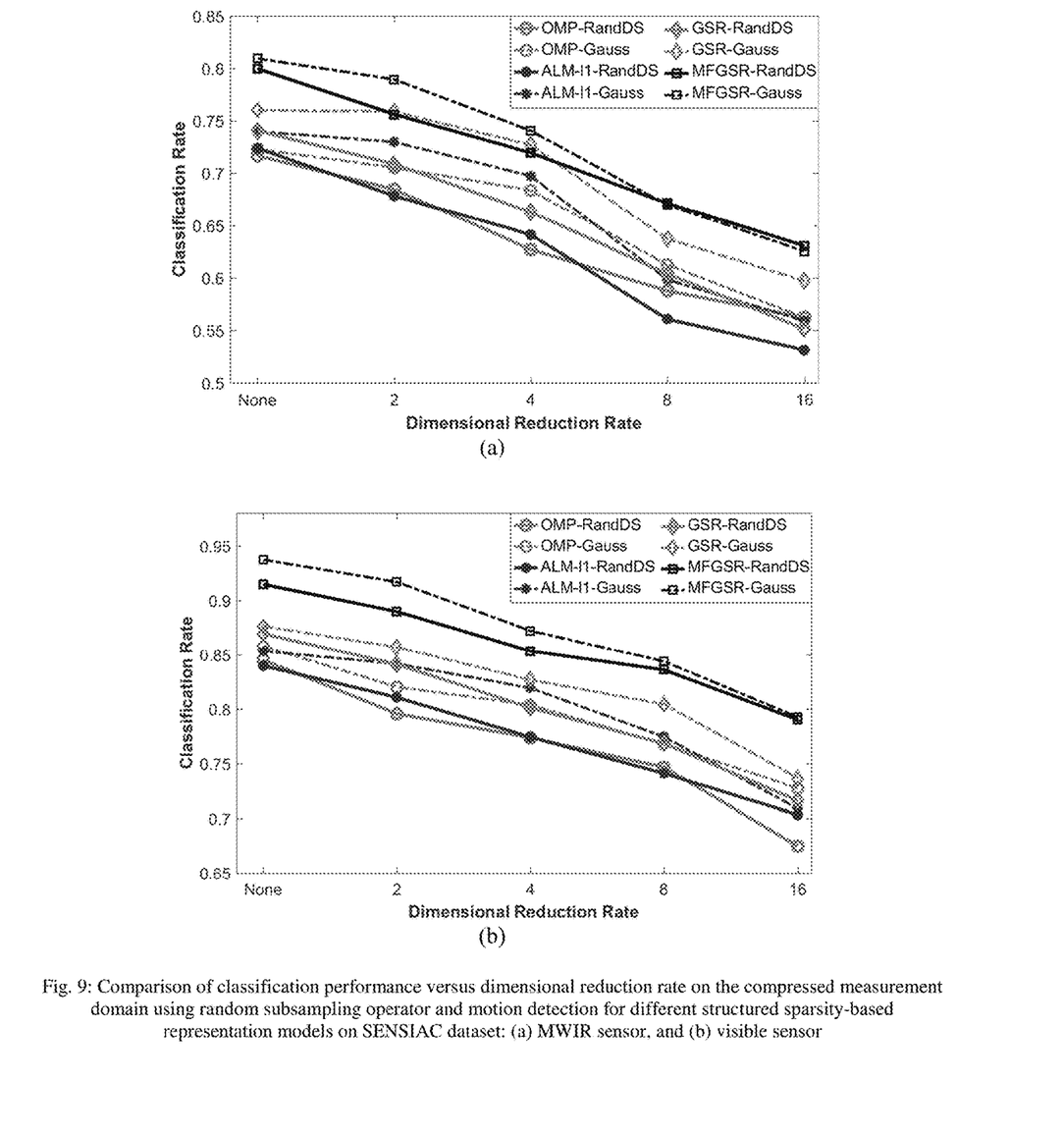
FIG. 9 illustrates a comparison of classification performance versus dimensional reduction rate on the compressed measurement domain using random subsampling operator and motion detection for different structured sparsity-based representation models on SENSing Information Analysis Center (SENSIAC) dataset: (a) Mid-Wave InfraRed (MWIR) sensor, and (b) visible sensor.

(cited reference #18), $l_1$-based Augmented Lagrangian Multiplier method (ALM-11) (cited reference #19), GSR (cited reference #12), and MFGSR. The comparison of classification performance versus dimensional reduction rate on the compressed measurement domain using random subsampling operator and motion detection for different structured sparsity-based representation models on SENSIAC dataset (cited reference #20) are displayed in FIG. 9. The number of targets is 7 day '2007' (i.e. 2000-m range) for training, and day '2005' (i.e. 1500-m range) for testing are used. In each sub-figure, the solid lines display the results of the methods using a random subsampling operator with motion detection while the dash lines show the results with the corresponding methods using a Gaussian sensing matrix with pre-determined target location. The classification accuracy rates of random subsampling operator approach are just slightly lower than those of the Gaussian one, not to mention that its results are directly taken by motion detection inputs. This clearly demonstrates the efficacy of the approach of the present invention where both target detection and classification steps can be conducted directly in the compressed random subsampling measurements.

Frequency Domain SRC Approach

The direct approach is sensitive to re-centering error, which may not be perfect for all frames. Here, the present invention proposes to transform the cropped target area into frequency domain by using Fast Fourier transform (FFT). Based on our experience, the classification performance will be better if we fill in the missing data for the cropped target area. Any missing data completion algorithms (cited references #9-#11) can be used. After FFT, the transformed coefficients are centered. The absolute values of the coefficients are then taken. It should be noted that the target templates in the dictionary need to be transformed to frequency domain by using FFT as well.

During the classification process, there are some additional steps:
1) The target templates in the dictionary are normally larger than the captured targets. So, the target templates to match that of the captured target must be trimmed;
2) After trimming, the targets and the target templates are vectorized;
3) Target classification is then done by using OMP and ALM-11 mentioned earlier.

Table 2 shows the confusion matrix of target classification results where three trucks (Ram, Frontier, and Silverado) were being tracked using videos with 50% missing data. Moreover, we also include results using GSR and mean square error (MSE) (cited reference #17) approaches. For each case, we have results with and without FFT. Results with FFT are better than that without using FFT. For example, for Frontier, the classification rates with FFT are more than 30% better than those without using FFT.

TABLE 2

Confusion matrix at 50% missing rate.

| | | Predicted | | | | | | | | | | | |
|---|---|---|---|---|---|---|---|---|---|---|---|---|---|
| | | Ram | | | | Frontier | | | | Silverado | | | |
| | Class | OMP | ALM | GSR | MSE | OMP | ALM | GSR | MSE | OMP | ALM | GSR | MSE |
| | | (a) Without FFT | | | | | | | | | | | |
| Actual | Ram | 0.85 | 0.84 | 0.8 | 0.9 | 0.12 | 0 | 0 | 0 | 0.03 | 0.16 | 0.2 | 0.09 |
| | Frontier | 0.29 | 0.2 | 0.17 | 0.27 | 0.66 | 0.42 | 0.49 | 0.43 | 0.06 | 0.38 | 0.34 | 0.3 |
| | Silverado | 0.26 | 0.22 | 0.21 | 0.16 | 0.01 | 0.02 | 0.03 | 0.03 | 0.72 | 0.76 | 0.76 | 0.81 |
| | | (b) With FFT | | | | | | | | | | | |
| Actual | Ram | 0.99 | 0.93 | .92 | 0.98 | 0 | 0 | 0 | 0.01 | 0.01 | 0.07 | 0.08 | 0 |
| | Frontier | 0.07 | 0.07 | 0.01 | 0.32 | 0.9 | 0.87 | 0.98 | 0.67 | 0.02 | 0.06 | 0.02 | 0.01 |
| | Silverado | 0.15 | 0.2 | 0.07 | 0.3 | 0.01 | 0 | 0 | 0.02 | 0.84 | 0.8 | 0.93 | 0.68 |

Post-Classification Enhancement Step

To further increase the classification performance, we propose a decision level fusion, which is based on voting. At a particular instant, the classification decision is based on all decisions made in the past N frames. That is, the decision is based on majority voting. The class label with the most votes will be selected as the decision at the current instance.

TABLE 3

Confusion matrix at 50% missing rate with majority voting scheme.

| | | Predicted | | | | | | | | | | | |
|---|---|---|---|---|---|---|---|---|---|---|---|---|---|
| | | Ram | | | | Frontier | | | | Silverado | | | |
| | Class | OMP | ALM | GSR | MSE | OMP | ALM | GSR | MSE | OMP | ALM | GSR | MSE |
| | | (a) Without FFT | | | | | | | | | | | |
| Actual | Ram | 0.94 | 0.88 | .82 | 0.96 | 0.06 | 0 | 0 | 0 | 0 | 0.12 | 0.18 | 0.04 |
| | Frontier | 0.22 | 0.14 | 0.08 | 0.23 | 0.75 | 0.48 | 0.56 | 0.51 | 0.02 | 0.38 | 0.36 | 0.26 |
| | Silverado | 0.36 | 0.13 | 0.1 | 0.24 | 0.04 | 0 | 0 | 0 | 0.6 | 0.87 | 0.9 | 0.76 |

TABLE 3-continued

Confusion matrix at 50% missing rate with majority voting scheme.

| | | Predicted | | | | | | | | | | | |
|---|---|---|---|---|---|---|---|---|---|---|---|---|---|
| | | Ram | | | | Frontier | | | | Silverado | | | |
| | Class | OMP | ALM | GSR | MSE | OMP | ALM | GSR | MSE | OMP | ALM | GSR | MSE |
| | | | | | (b) With FFT | | | | | | | | |
| Actual | Ram | 1 | 0.94 | .93 | 1 | 0 | 0 | 0 | 0 | 0 | 0.06 | 0.07 | 0 |
| | Frontier | 0.04 | 0.05 | 0 | 0.3 | 0.96 | 0.91 | 1 | 0.69 | 0.01 | 0.05 | 0 | 0.01 |
| | Silverado | 0.12 | 0.18 | 0.05 | 0.28 | 0 | 0 | 0 | 0 | 0.88 | 0.82 | 0.95 | 0.72 |

Table 3 shows the confusion matrix for the same scenario shown in Table 2. One can see that the classification performance has been improved by 3% to more than 10% in a few cases.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

CITED REFERENCES

[#1] J. Zhou and C. Kwan, "Anomaly detection in Low Quality Traffic Monitoring Videos Using Optical Flow," SPIE Defense+Security Conference, Orlando, Fla., April 2018.
[#2] C. Kwan, J. Yin, and J. Zhou, "The Development of a Video Browsing and Video Summary Review Tool," SPIE Defense+Security Conference, Orlando, Fla., April 2018.
[#3] J. Zhou and C. Kwan, "Tracking of Multiple Pixel Targets Using Multiple Cameras," submitted to 15th International Symposium on Neural Networks, 2018.
[#4] C. Kwan, B. Chou, and L. M. Kwan, "Comparison of deep learning and conventional object tracking approaches for low quality videos," submitted to 15th International Symposium on Neural Networks, 2018.
[#5] Bertinetto, Luca, et al. "Staple: Complementary learners for real-time tracking."
Proceedings of the IEEE Conference on Computer Vision and Pattern Recognition. 2016.
[#6] Stauffer, C. and Grimson, W. E. L, "Adaptive Background Mixture Models for Real-Time Tracking, Computer Vision and Pattern Recognition", IEEE Computer Society Conference on, Vol. 2, pp. 2246-252, 1999.
[#7] C. Kwan, J. Zhou, Z. Wang, and B. Li, and "Efficient Anomaly Detection Algorithms for Summarizing Low Quality Videos," SPIE Defense+Security Conference, Orlando, Fla., April 2018.
[#8] J. Zhou, C. Kwan, and B. Ayhan, "A High Performance Missing Pixel Reconstruction Algorithm for Hyperspectral Images," 2nd. International Conference on Applied and Theoretical Information Systems Research, Taipei, Taiwan, Dec. 27-29, 2012.
[#9] J. Zhou and C. Kwan, "High Performance Image Completion based on Sparsity," SPIE Defense+Security Conference, Orlando, Fla., April 2018.
[#10] J. Zhou, C. Kwan, and T. Tran, "ATR Performance Improvement Using Images with Corrupted or Missing Pixels," SPIE Defense+Security Conference, Orlando, Fla., April 2018.
[#11] J. Zhou and C. Kwan, "Missing Link Prediction in Social Networks," submitted to 15th International Symposium on Neural Networks, 2018.
[#12] M. Dao, C. Kwan, B. Ayhan, and T. Tran, "Burn Scar Detection Using Cloudy MODIS Images via Low-rank and Sparsity-based Models," *IEEE Global Conference on Signal and Information Processing*, pp. 177-181, Greater Washington, D.C., USA, Dec. 7-9, 2016.
[#13] W. Wang, S. Li, H. Qi, B. Ayhan, C. Kwan, and S. Vance, "Identify Anomaly Component by Sparsity and Low Rank, " *IEEE Workshop on Hyperspectral Image and Signal Processing: Evolution in Remote Sensor (WHISPERS)*, Tokyo, Japan, Jun. 2-5, 2015.
[#14] S. Li, W. Wang, H. Qi, B. Ayhan, C. Kwan, and S. Vance, "Low-rank Tensor Decomposition based Anomaly Detection for Hyperspectral Imagery, " *IEEE International Conference on Image Processing (ICIP)*, pp. 4525-4529, Quebec City, Canada, Sep. 27-30, 2015.
[#15] Y. Qu, R. Guo, W. Wang, H. Qi, B. Ayhan, C. Kwan, and S. Vance, "Anomaly Detection in Hyperspectral Images Through Spectral Unmixing and Low Rank Decomposition, " *IEEE International Geoscience and Remote Sensing Symposium (IGARSS)*, pp. 1855-1858, Beijing, July 2016.
[#16] M. Dao, C. Kwan, K. Koperski, and G. Marchisio, "A Joint Sparsity Approach to Tunnel Activity Monitoring Using High Resolution Satellite Images," IEEE Ubiquitous Computing, Electronics & Mobile Communication Conference, 2017.
[#17] C. Kwan, B. Budavari, M. Dao, and J. Zhou, "New Sparsity Based Pansharpening Algorithm for Hyperspectral Images," IEEE Ubiquitous Computing, Electronics & Mobile Communication Conference, 2017.
[#18] J. A. Tropp, "Greed is good: Algorithmic results for sparse approximation," *IEEE Transactions on Information Theory*, vol. 50, no. 10, pp. 2231-2242, 2004.
[#19] J. Yang and Y. Zhang, "Alternating direction algorithms for 11-problems in compressive sensing, " *SIAM journal on scientific computing*, vol. 33, pp. 250-278, 2011.
[#20] SENSIAC, "ATR algorithm development image database," available online at https://www.sensiac.org/external/products/list_databases.jsf

The invention claimed is:
1. A system for target detection, tracking and classification directly in a compressive measurement domain, comprising:
   an Imager having a Motion Detector (MD) means connected to a Saliency Based Re-centering (SBR) generator means for outputting a target location;
   a Missing Data Completion (MDC) generator connected to the output of the SBR generator means;

output of the MDC generator is connected to a Target Classification (TC) generator;
a random subsampling operator means to compress video data; and
the output of the TC generator is connected to a Voting Based Scheme (VBS) generator means for generating a target type of image.

2. A system for target detection, tracking and classification directly in a compressive measurement domain in accordance to claim 1, further comprising:
a Fast Fourier Transform (FFT) is connected between the MDC generator and the TC generator; and
another FFT is connected between a Target Dictionary (TD) and the TC generator.

3. A system for target detection, tracking and classification directly in a compressive measurement domain in accordance to claim 1, wherein the MD means is based on a Gaussian Mixture Model (GMM).

4. A system for target detection, tracking and classification directly in a compressive measurement domain in accordance to claim 1, wherein the TC generator is based on a Sparse Representation Classification (SRC).

5. A system for target detection, tracking and classification directly in a compressive measurement domain in accordance to claim 4, wherein the TC is using a subset of pixels in each frame.

6. A method of target detection, tracking and classification directly in a compressive measurement domain, comprising the steps of:
automatic detecting a target location in a first frame using a Gaussian Mixture Model (GMM);
re-centering the target location using a Saliency-based detection;
filling in missing pixels in the detected target;
classifying the target using a frequency domain Sparse Representation Classification (SRC) approach; and
further enhancing the target classification performance using compressed data directly.

7. A method of target detection, tracking and classification directly in a compressive measurement domain in accordance to claim 6, further comprising the steps of:
saving data storage space by using the compressed data; and
reducing the transmission bandwidth of videos.

8. A method of target detection, tracking and classification directly in a compressive measurement domain in accordance to claim 6, further comprising the steps of:
repeating the re-centering process multiple times to improve accuracy of the target location.

9. A method of target detection, tracking and classification directly in a compressive measurement domain in accordance to claim 6, wherein
a pixel completion algorithm is used to fill in the missing pixels for the captured target location.

10. A method of target detection, tracking and classification directly in a compressive measurement domain in accordance to claim 6, further comprising the steps of:
transforming target templates in a dictionary and the detected targets to a frequency domain using Fast Fourier Transform (FFT).

11. A method of target detection, tracking and classification directly in a compressive measurement domain in accordance to claim 6, further comprising the steps of:
applying a decision level fusion based on voting to further improve the classification performance.

* * * * *